US008899953B2

(12) United States Patent
Bufton

(10) Patent No.: US 8,899,953 B2
(45) Date of Patent: Dec. 2, 2014

(54) EXTRUSION DIE HEAD

(75) Inventor: Andrew Bufton, Aylesbury (GB)

(73) Assignee: Cadbury UK Limited (GB)

( * ) Notice: Subject to any disclaimer, the term of this patent is extended or adjusted under 35 U.S.C. 154(b) by 87 days.

(21) Appl. No.: 13/377,248

(22) PCT Filed: Jun. 4, 2010

(86) PCT No.: PCT/GB2010/001108
§ 371 (c)(1),
(2), (4) Date: Feb. 8, 2012

(87) PCT Pub. No.: WO2010/142941
PCT Pub. Date: Dec. 16, 2010

(65) Prior Publication Data
US 2012/0135122 A1 May 31, 2012

(30) Foreign Application Priority Data

Jun. 10, 2009 (GB) .................................. 0909988.8

(51) Int. Cl.
B29C 47/06 (2006.01)
B29C 47/08 (2006.01)
(Continued)

(52) U.S. Cl.
CPC ................. *A23P 1/125* (2013.01); *B29C 47/12* (2013.01); *A23G 3/2015* (2013.01);
(Continued)

(58) Field of Classification Search
CPC .... B29C 47/04; B29C 47/043; B29C 47/046; B29C 47/0828; B29C 47/128
USPC ............ 425/131.1, 132, 133.1, 133.5, 192 R, 425/381, 462, 466; 426/516; 264/171.1, 264/173.12, 173.16
See application file for complete search history.

(56) References Cited

U.S. PATENT DOCUMENTS 3,227,103 A 1/1966 Schafer
3,344,751 A 10/1967 Cammack et al.
(Continued)

FOREIGN PATENT DOCUMENTS

CA 1290974 10/1991
DE 19813465 A1 10/1998
(Continued)

OTHER PUBLICATIONS

ISR PCT/GB2010/001108 dated Oct. 15, 2010.
(Continued)

*Primary Examiner* — Yogendra Gupta
*Assistant Examiner* — Joseph Leyson
(74) *Attorney, Agent, or Firm* — Cantor Colburn LLP

(57) ABSTRACT

An extrusion die head for the extrusion of hollow or center-filled shapes as well as apparatus comprising the extrusion die head and methods employing the die head. The extrusion die head (10) is for the preparation of a plurality of center-filled products (34) of varying composition wherein each product comprises a first (filling) material and a second (outer) material. The die head comprises at least one tube (22) such that a first material may be extruded through the tube or tubes and a second material may be extruded around the tube or tubes. The location and the number of the tubes may be customized to vary the location and amount of the first material relative to the second material and thereby vary the composition of the center-filled product. The extrusion die head apparatus comprises a sleeve (40) enclosing the die head. In one embodiment a first material is conveyed from one or more first apertures (18) via one or more tubes (22) to one or more second apertures (20) where it is extruded. Simultaneously, a second material is supplied directly to the remaining second apertures (20) where it is extruded.

25 Claims, 3 Drawing Sheets

(51) Int. Cl.
  *B29C 47/12* (2006.01)
  *A23G 3/20* (2006.01)
  *A23P 1/12* (2006.01)
  *A23G 3/34* (2006.01)
  *A21C 11/16* (2006.01)
  *B29C 47/00* (2006.01)

(52) U.S. Cl.
  CPC ........... *B29C 47/003* (2013.01); *B29C 47/0057* (2013.01); *B29C 47/128* (2013.01); *A23G 3/0068* (2013.01); *A21C 11/163* (2013.01)
  USPC ................ 425/131.1; 264/171.1; 264/173.12; 264/173.16; 425/192 R; 425/381; 425/462; 425/466; 426/516

(56) References Cited

U.S. PATENT DOCUMENTS

| | | | |
|---|---|---|---|
| 3,408,960 | A | 11/1968 | Stanley |
| 3,779,676 | A | 12/1973 | Bernard |
| 3,793,466 | A * | 2/1974 | Kawkins et al. ............. 426/274 |
| 3,840,311 | A | 10/1974 | Wight |
| 4,075,270 | A | 2/1978 | Cunningham |
| 4,480,980 | A * | 11/1984 | McFarland et al. ........ 425/131.1 |
| 6,086,352 | A | 7/2000 | McFarland |
| 6,755,638 | B2 | 6/2004 | Chen et al. |
| 2005/0092365 | A1 | 5/2005 | Rawes et al. |
| 2010/0052208 | A1 * | 3/2010 | Jacobs et al. ................. 264/241 |

FOREIGN PATENT DOCUMENTS

| | | |
|---|---|---|
| DE | 202007013318 U1 * | 1/2008 |
| EP | 0891854 | 1/1999 |
| EP | 2440069 A1 | 4/2012 |
| GB | 1375208 | 11/1974 |
| GB | 1405619 | 9/1975 |
| GB | 2186836 A | 8/1987 |
| JP | 61135575 | 6/1986 |
| JP | 09224575 | 9/1997 |
| JP | 10337765 | 12/1998 |
| WO | WO9727760 | 8/1997 |
| WO | 0138071 | 5/2001 |
| WO | 03026863 A1 | 4/2003 |
| WO | 2004076144 A1 | 9/2004 |
| WO | 2005009149 A1 | 2/2005 |

OTHER PUBLICATIONS

GB SR GB0909988.8 dated Oct. 8, 2009, Claims searched 1-27, 2 refs.
GB SR GB0909988.8 dated Oct. 8, 2009, Claims searched: 1 to 27, 3 refs.
GB SR GB0909988.8 dated Feb. 16, 2010, Claims searched: 28.
GB R GB0909988.8 dated Feb. 16, 2010, Claims searched 29, 30.
GB Search Report, Application No. GB0909988.8, dated May 9, 2013.
GB ER 0909988.8 dated Jul. 16, 2014.

* cited by examiner

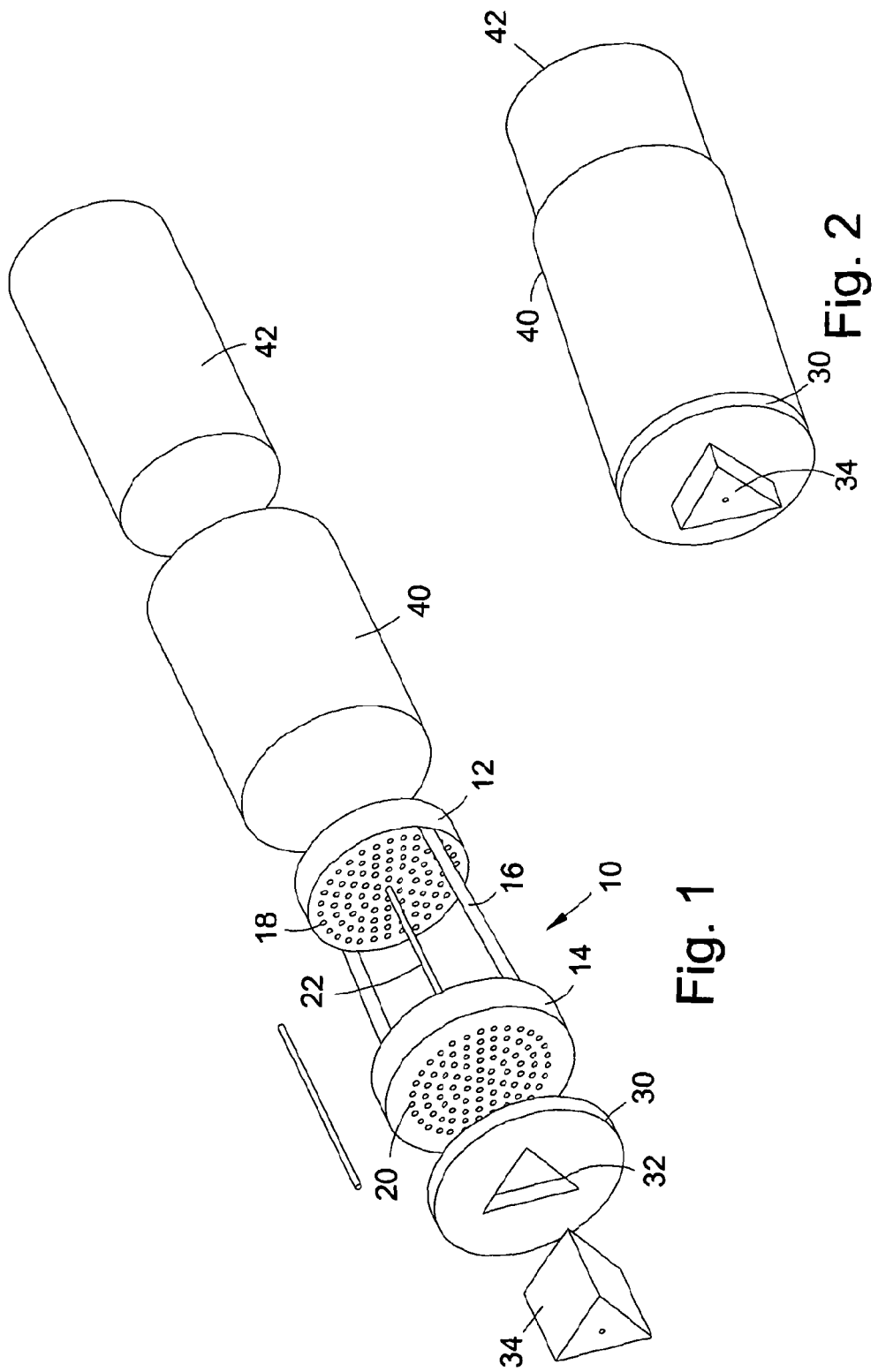

000# EXTRUSION DIE HEAD

TECHNICAL FIELD OF INVENTION

The present invention relates to an extrusion die head and apparatus comprising the extrusion die head, for the extrusion of hollow or centre-filled shapes.

BACKGROUND OF THE INVENTION

GB 2186836 describes an extrusion die for producing an internally supported hollow article. The die comprises an outer die part having a single aperture therein and an inner die part comprising a plurality of fluid injectors permanently fixed to a manifold. A material is extruded around the injectors and through the single aperture such that the extrudate has a number of passages therein. GB 2186836 discloses two types of extrusion die which have different arrangements of injectors in the inner die part and different shapes of aperture in the outer die part. The two extrusion dies have been specially designed to produce particular extruded products and cannot be adapted to vary the external shape or the arrangement of passages in the extrudate.

BRIEF SUMMARY OF THE INVENTION

It is an object of the present invention to provide an extrusion die which can be easily modified to produce a range of extruded products.

According to a first aspect of the present invention, there is provided an extrusion die head for the preparation of a plurality of centre-filled products of varying composition wherein each product comprises a first (filling) material and a second (outer) material, said die head comprising at least one tube such that a first material may be extruded through the tube or tubes and a second material may be extruded around the tube or tubes, wherein the location and the number of the tubes may be customised to vary the location and amount of the first material relative to the second material and thereby vary the composition of the centre-filled product.

In one embodiment the customisation is achieved by means of the or each tube being detachably engaged with a first plate having a plurality of first apertures therein. A flow path is defined for the first material from the first aperture through the associated tube. By detachably engaged, it will be understood that the or each tube is not permanently fixed to the first plate. Instead, the or each tube can be removed from its position at a given first aperture and then replaced in another position at a different first aperture. In this way, a range of products may be produced using a particular first plate.

According to a second aspect of the present invention there is provided an extrusion die apparatus comprising a sleeve enclosing the die head of the first aspect.

According to a third aspect of the present invention there is provided an extrusion method for the preparation of a plurality of centre-filled products of varying composition wherein each product comprises a first (filling) material and a second (outer) material, the method comprising co-extruding the first material through at least one tube and the second material around the tube or tubes;
wherein the location and the number of the tubes may be customised to vary the location and amount of the first material relative to the second material and thereby vary the composition of the centre-filled product.

The present invention also resides in a kit for preparing the die head of the first aspect comprising
a first plate having a plurality of first apertures therein; and
at least one tube suitable for linking with a first aperture.

In one embodiment the kit comprises a plurality of tubes suitable for linking with a plurality of first apertures. In another embodiment, the kit additionally comprises at least one blocking element for blocking a first aperture. Suitable blocking members include a cover (e.g. a silicone membrane) or a plug or bung.

According to a fourth aspect of the present invention, there is provided an extrusion die head comprising
a first plate having a plurality of first apertures therein;
a second plate spaced from the first plate and having a plurality of second apertures therein; and
at least one tube,
wherein the or each tube is detachably engaged at opposite ends to the first and second plates respectively whereby to define a flowpath between a pair of first and second apertures.

According to a fifth aspect of the present invention, there is provided an extrusion die apparatus comprising a sleeve enclosing the die head of the fourth aspect,
wherein the second plate is located at one end of the sleeve and the opposite end of the sleeve is engaged with a supply pipe for a second material;
and the first plate is provided at one end of a support which extends axially into the sleeve and is engaged with a supply pipe for a first material.

According to a sixth aspect of the present invention there is provided an extrusion method comprising extruding a first material and a second material using the extrusion die of the fourth aspect, comprising
conveying a first material from a first aperture via the at least one tube to a second aperture; and
simultaneously conveying a second material directly to a second aperture;
whereby to co-extrude the first material and the second material through the second apertures.

According to a seventh aspect of the present invention, there is provided a kit for preparing the die head of the fourth aspect comprising
a first plate having a plurality of first apertures therein;
a second plate having a plurality of second apertures therein; and
at least one tube for linking a first aperture to a second aperture.

In a particular embodiment, the kit additionally comprises at least one shaping plate for fastening to the second plate and thereby blocking at least one but not all of the second apertures therein. In a further embodiment the kit additionally comprises a plurality of shaping plates. In this way, a variety of shapes of extruded product may be obtained using the kit.

In another embodiment, the kit additionally comprises at least one blocking element for blocking a first aperture. Suitable blocking members include a cover (e.g. a silicone membrane) or a plug or bung.

It will be understood that the die head of the fourth aspect is employed to co-extrude a first material and a second material through the second apertures. The first material is conveyed from one or more first apertures via one or more tubes to one or more second apertures where it is extruded. Simultaneously, a second material is supplied directly to the remaining second apertures (those second apertures which are not engaged with a tube) where it is extruded. Those first apertures which are not engaged with a tube may be blocked to prevent the first and second materials passing through. The blocking of the excess first apertures may be achieved individually, for example by placing a plug or bung in each of the excess first apertures. Alternatively, a cover (e.g. a silicone membrane) may be placed around the first plate to cover all of the first apertures and then the at least one tube is punched through selected first apertures.

By detachably engaged, it will be understood that the tube can be removed from its position between a pair of first and second apertures and then replaced in another position between a different pair of first and second apertures. For example, the die head may be disassembled by separating the first and second plates and removing the tube from its position between one pair of first and second apertures and then reassembled by placing the tube in an alternative position between another pair of first and second apertures. Alternatively, the tube may be removed from the first and second plates by sliding the entire length of the tube through a first or second aperture.

The use of a detachable tube is advantageous because the composition of the extrudate can be easily altered without the need to redesign the entire die head. By transferring the tube or tubes to different first and second apertures, the location of the first material (usually a filling material) within the second material may be modified.

The number and arrangement of the tubes may be varied to provide a range of different patterns in the resulting extrudate. The tubes may provide a flowpath to a series of first apertures which together form a shape. Suitable shapes include a triangle, a square, a rectangle, a pentagon, a hexagon, a circle and a star.

The cross-section of the extrudate (formed by the first and second materials) will correspond to the shape formed by all of the second apertures. For example, if the second apertures are arranged to form a circle, the resulting extrudate will have a circular cross-section. The location of the first material within the second material will vary depending on the location of the tubes but the cross-section of the extrudate will remain constant. In a particular embodiment, a shaping plate is fastened to the second plate so that the cross-section of the resulting extrudate may be modified. The shaping plate comprises at least one aperture and modifies the cross-section of the resulting extrudate by blocking at least one but not all of the second apertures. The shaping plate is typically thinner than the second plate and provides a simple, inexpensive way to modify the die head. The shaping plate may be made from a plastics material, metal or glass. The shaping plate may be fixed against relative rotation with second plate. Alternatively, the shaping plate may be rotatable relative to the second plate.

The second plate may comprise at least 25, at least 40, at least 60, at least 75, at least 90, at least 120 or at least 150 second apertures. In one embodiment, the number of second apertures is greater than the number of tubes.

The number of first apertures may be equal to the number of second apertures. Alternatively, the number of first apertures may be less than the number of second apertures.

The cross-section of each second aperture is selected depending on the desired appearance of the resulting product, for example, the cross-section of each second aperture may be circular, square or diamond. In a particular embodiment, the cross-section of each of the second apertures is circular. The cross-section of each second aperture may be the same as or different from the cross-section of any of the first apertures. In a particular embodiment, the cross-section of each second aperture is circular.

It will be understood that the at least one tube must have a good seal with the first and second apertures to ensure successful extrusion. In one embodiment, the opposite ends of the tube are sealed within the first and second apertures respectively. In that embodiment, the exterior cross-section of the at least one tube may be the same as the cross-section of the first and/or second apertures.

Each second aperture has a diameter. As used herein, 'diameter' is used to refer to the maximum width of the second aperture regardless of cross-sectional shape (i.e. not limited to circular cross-sections).

The second apertures may have a diameter of less than 10 mm, less than 6 mm, less than 3 mm, less than 2 mm, less than 1 mm, less than 0.5 mm, or less than 0.25 mm. Smaller apertures are useful since they allow for intricate patterns to be obtained. In some embodiments the apertures have a diameter of less than 100 µm, 50 µm, or 10 µm. An extrusion die having such small apertures is disclosed in International (PCT) Application Publication No. WO 2005/056272. The use of very small apertures allows for the incorporation of capillaries of the first material in the resulting extruded material. Such capillaries of first material are thought to be less prone to leakage through the second material than thicker channel of first material may be.

In one embodiment, all of the second apertures have substantially the same size and shape such that the at least one tube may be employed to deliver the first material to any one of the second apertures i.e. the second plate comprises just one series of second apertures where each of the first apertures within the series has substantially the same size and shape as the other second apertures within that series. Alternatively, the second apertures may have a range of different sizes and shapes. It will be understood that it is more convenient if a given tube can be employed to deliver material to any one of a large number of second apertures. In a particular embodiment, the second plate comprises no more than three series of second apertures where each of the second apertures within a given series has substantially the same size and shape as the other second apertures within that series.

The second apertures are spaced apart from one another by a given distance. In a particular embodiment the ratio of the diameter of a second aperture to the shortest distance between that second aperture and its nearest neighbour is from 3:1 to 1:1 and may be approximately 2:1. This range of ratios has been found to be particularly useful for producing a cohesive extruded product.

The second plate may be made from plastics or metal, for example stainless steel. In a particular embodiment, the second plate is made from metal. The second plate may be disc-shaped. In a particular embodiment, the first and second plates have the same shape.

The first and second plates must remain spaced from one another in use. This may be achieved by placing connecting members between the first and second plates. The connecting members may be detachably engaged (for example, using screw fixings) with the first and/or second plates so the die head can be easily disassembled and reassembled. Alternatively the first plate can be secured to the interior surface of the sleeve so that it remains spaced from the second plate.

According to an eighth aspect of the present invention, there is provided an extrusion die head comprising
a shaping plate having a shaping aperture therein;
a first plate spaced from the shaping plate and having a plurality of first apertures therein; and
at least one tube located between the shaping plate and the first plate;
wherein the or each tube is detachably engaged at one end to the first plate whereby to define a flowpath between the first aperture and the shaping aperture.

According to a ninth aspect of the present invention, there is provided an extrusion die apparatus comprising a sleeve enclosing the die head of the eighth aspect,
wherein the shaping plate is located at one end of the sleeve and the opposite end of the sleeve is engaged with a supply pipe for a second material;
and the first plate is provided at one end of a support which extends axially into the sleeve and is engaged with a supply pipe for a first material.

According to a tenth aspect of the present invention there is provided an extrusion method comprising extruding a first material and a second material using the extrusion die of the eighth aspect, comprising
conveying a first material from a first aperture via the at least one tube to the shaping aperture; and
simultaneously conveying a second material directly to the shaping aperture;
whereby to co-extrude the first material and the second material through the shaping aperture.

According to an eleventh aspect of the present invention, there is provided a kit for preparing the die head of the eighth aspect comprising
a shaping plate having a shaping aperture therein;
a first plate having a plurality of first apertures therein; and
at least one tube for linking a first aperture to the shaping aperture.

In another embodiment, the kit additionally comprises at least one blocking element for blocking a first aperture. Suitable blocking members include a cover (e.g. a silicone membrane) or a plug or bung.

It will be understood that the die head is employed to co-extrude a first material and a second material through the shaping aperture in the shaping plate. The first material is conveyed from one or more first apertures via one or more tubes to the shaping aperture where it is extruded. Simultaneously, the second material is supplied directly to the shaping aperture where is extruded around the tube or tubes. In some embodiments, those first apertures which are not engaged with a tube are blocked to prevent the first and second materials passing through.

By detachably engaged, it will be understood that the tube can be removed from its position between the first aperture and the shaping aperture and then replaced in another position between a different first aperture and the spacing aperture. For example, the die head may be disassembled by separating the shaping plate and the first plate, removing the tube and then reassembled by placing the tube in an alternative position between a different first aperture and the shaping aperture. Alternatively, the tube may be removed by sliding the entire length of the tube through the shaping aperture or a first aperture.

The use of a detachable tube is advantageous because the composition of the extrudate can be easily altered without the need to redesign the entire die head. By transferring the tube or tubes to different first apertures, the location of the first material (usually a filling material) within the second material may be modified.

The shaping plate may be fixed against relative rotation with the first plate or the shaping plate may be rotatable relative to the first plate.

If desired, a further plate having a plurality of apertures therein (a second plate) may be located between the shaping plate and the first plate.

In one embodiment the die head comprises at least 10, at least 15, at least 30 or at least 60 tubes. By increasing the number of tubes, the complexity of the pattern produced by the first material may be increased. The tube may be rigid or flexible and may be made from a plastics material, metal or glass. In a particular embodiment, the tube is a hollow steel or copper rod.

The tubes may have an inner diameter of less than 10 mm, less than 6 mm, less than 3 mm, less than 2 mm or less than 1 mm. Smaller tube diameters are useful since they allow for intricate patterns to be obtained. In some embodiments the tube or tubes may have an inner diameter of less than 500 µm, less than 250 µm, less than 100 µm, less than 50 µm, or less than 10 µm. The tubes may be considered to be microcapillaries. Extrusion dies comprising needles having very small bores are disclosed in International (PCT) Application Publication No. WO 2005/056272 and WO2008044122. The use of very small bores allows for the incorporation of capillaries of the first material in the resulting extruded material. Such capillaries of first material are thought to be less prone to leakage through the second material than thicker channel of first material may be.

The inner diameter of the tube or tubes will affect the diameter of the channels of filling material in the extrudate. It will be understood that the extrudate can be stretched (pulled) as it exits the die head making it thinner and thereby decreasing the diameter of the filling material. For example, an extrudate made from a die head comprising a tube having an inner diameter of 3 mm can be stretched such the filling material has a diameter of just 1 mm.

In one embodiment, the number of first apertures is greater than the number of tubes.

The first plate may comprise at least 25, at least 40, at least 60, at least 75, at least 90, at least 120 or at least 150 first apertures.

Each first aperture has a diameter. As used herein, 'diameter' is used to refer to the maximum width of the first aperture regardless of cross-sectional shape (i.e. not limited to circular cross-sections).

The first apertures may have a diameter of less than 10 mm, less than 6 mm, less than 3 mm, less than 2 mm, less than 1 mm, less than 0.5 mm, or less than 0.25 mm. Smaller apertures are useful since they allow for intricate patterns to be obtained. In some embodiments the apertures have a diameter of less than 100 µm, 50 µm, or 10 µm. An extrusion die having such small apertures is disclosed in International (PCT) Application Publication No. WO 2005/056272. The use of very small apertures allows for the incorporation of capillaries of the first material in the resulting extruded material. Such capillaries of first material are thought to be less prone to leakage through the second material than thicker channel of first material may be.

The first apertures are spaced apart from one another by a given distance. In a particular embodiment the ratio of the diameter of a first aperture to the shortest distance between that first aperture and its nearest neighbour is from 3:1 to 1:1 and may be approximately 2:1.

According to a twelfth aspect of the present invention, there is provided an extrusion die head comprising
a shaping plate having a shaping aperture therein; and
a first plate spaced from the shaping plate and having a plurality of telescopic tubes attached thereto, each tube having an extended position whereby to define a flowpath through the tube to the shaping aperture and a retracted position whereby to prevent flow therethough.

According to a thirteenth aspect of the present invention, there is provided an extrusion die apparatus comprising a sleeve enclosing the die head of the twelfth aspect,
wherein the shaping plate is located at one end of the sleeve and the opposite end of the sleeve is engaged with a supply pipe for a second material;

and the first plate is provided at one end of a support which extends axially into the sleeve and is engaged with a supply pipe for a first material.

According to a fourteenth aspect of the present invention there is provided an extrusion method comprising extruding a first material and a second material using the extrusion die of the twelfth aspect, comprising conveying a first material through an extended telescopic tube to the shaping aperture; and simultaneously conveying a second material directly to the shaping aperture;

whereby to co-extrude the first material and the second material through the shaping aperture.

It will be understood that the die head is employed to co-extrude a first material and a second material through the shaping aperture in the shaping plate. The first material is conveyed from the first plate through the extended tubes to the shaping aperture where it is extruded. Simultaneously, the second material is supplied directly to the shaping aperture where it is extruded around the extended tube or tubes. By varying the number and location of the tubes that are in the extended position and those in the retracted position, the amount and location of the first material relative to the second material may be modified.

The first plate may be made from plastics or metal, for example stainless steel. In a particular embodiment, the first plate is made from metal. The first plate may be disc-shaped.

If desired, a plurality of supply pipes may be employed to deliver a plurality of first materials to the first plate and/or apertures.

In one embodiment the first material is a filling material selected from a gas, liquid, gel, paste, powder or an extrudable solid. It will be understood that where a gas is used as the first material, the resulting product will have hollow portions.

Suitable gases include non-toxic gases suitable for food use such as air, nitrogen, nitrous oxide, and carbon dioxide. Suitable liquids include oils, including fruit flavouring oils, herbal flavouring oils; alcoholic beverages, including liqueurs; syrups, including glucose syrups, high fructose corn syrups, high maltose corn syrups; and sugar-free syrups; viscous liquids such as caramels; and emulsions, including creams (oil-in-water emulsions), and water-in-oil emulsions. Suitable gels include those derived from gelatin, gum Arabic, locust bean gum, guar gum, carrageenan or alginates. Suitable pastes include almond paste, peanut paste, other nut pastes, starch-based pastes, and fruit pastes (such as purées). Suitable powders include sherbet, popping candy, and other confectionery powders. Suitable extrudable solids include chewing gum, bubble gum, candy, and chocolate (such as aerated and non-aerated forms of milk, dark or white chocolate, optionally including additional flavourings). Where the filling material is chocolate and the second material is chocolate, it will be understood that the chocolate of the filling material will typically be distinguishable from that of the second material. For example, where the second material is (non-aerated) milk chocolate, the filling material may be selected from white chocolate, dark chocolate, aerated milk chocolate, praline, or flavoured milk chocolate (such as with mint or orange flavour).

In some embodiments, the method further comprises modifying a filling material within the product. Such modification may involve a change in physical state, such as for example solidification of a liquid; or a change in composition, such as a loss in moisture, or a chemical reaction. The modification may be caused by active treatment of the extruded product (such as maintaining the temperature of the extruded product above or below a certain level, or storing it in an atmosphere having a specific humidity level) or may happen passively as a result of the environment within the extrudate following extrusion or simply after a period of time. For example, the filling material may be an aqueous solution of gelatine, which, following cooling of the extrudate, sets into a gel.

In one embodiment, the second material is an edible extrudable solid. Suitable edible extrudable solids include chewing gum, bubble gum, candy, and chocolate (such as aerated and non-aerated forms of milk, dark or white chocolate, optionally including additional flavourings).

According to a fifteenth aspect of the present invention there is a provided a extrusion die apparatus comprising a sleeve enclosing a die head, wherein the die head comprises a shaping plate having a shaping aperture therein and the shaping plate is detachably engaged with the sleeve.

In prior art extrusion dies, the shaping plate is integrally formed with the rest of the apparatus such that it cannot be removed and replaced. It is therefore necessary to shut down the production line when changing from one shape of product to another. The use of a detachable shaping plate allows the shaping plate to be replaced quickly and easily such that a plurality of products having different cross-sections may be made.

According to a sixteenth aspect of the present invention there is provided a shaping plate for an extrusion die, the shaping plate comprising a shaping aperture therein, wherein the outline of the shaping aperture may be changed.

In a particular embodiment, the shaping plate comprises at least one cover portion which may be moved to restrict the shaping aperture and thereby change its outline. In a particular embodiment, the cover portion is located within the shaping plate and moves linearly to restrict the shaping aperture.

The outline of the shaping aperture may be changed such that the die can be used to make products with different cross-sections without having to replace the shaping plate. This is useful to quickly swap production to different products or might even be employed during the production of a single product such that the product has a variable cross-section. Conveniently, the outline of the shaping aperture will be changed remotely to assist in the automation of the extrusion method.

Embodiments of the invention will now be described by way of example, with reference to the following figures.

BRIEF DESCRIPTION OF THE FIGURES

FIG. 1 is an expanded perspective view of an apparatus comprising a die head in accordance with an embodiment of the invention.

FIG. 2 is a perspective view of the apparatus of FIG. 1

DETAILED DESCRIPTION OF THE INVENTION

Figure 3:
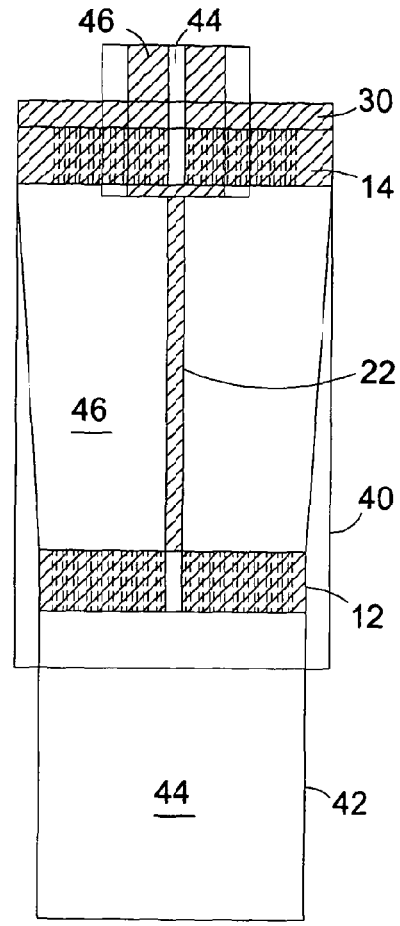
FIG. 3 a cross-section of the apparatus of FIG. 1.

FIG. 1 shows a stainless steel die head 10 comprising a disc-shaped first plate 12 and a disc-shaped second plate 14 spaced apart and connected by two rigid connecting members 16 which have been screwed to the first and second plates 12,14. The first plate 12 and the second plate 14 comprise approximately 90 first circular apertures 18 and approximately 90 second circular apertures 20 respectively. The first apertures 18 and the second apertures 20 are arranged in a pattern of concentric circles. A hollow rod 22 links a first aperture 18 in the centre of the first plate 12 and a second aperture 20 in the centre of the second plate 14. The rod 20 has an inner diameter of approximately 1.8 mm. Whilst just one rod 22 is shown for the sake of clarity, it will be understood that a number of rods may be employed.

A stainless steel shaping plate 30 may be fastened to the second plate 14 to change the shape of resulting extrudate. The shaping plate 30 is also disc-shaped and comprises a triangular aperture 32 although the skilled reader will appreciate that any number of shapes could employed. The shaping plate 30 is thinner than the first and second plates 12,14 and a number of such plates can be easily machined with different shapes of apertures. The extruded product 34 has a triangular cross-section and a filling through its centre. The die head 10 is sealed within a cylindrical sleeve 40 and the first plate 12 is attached to a support 42.

Referring to FIG. 2, there is shown a perspective view of the apparatus. The die head 10 is sealed within the sleeve 40 and is not visible.

Referring to FIG. 3, there is shown a cross-section of the apparatus in use. The die head 10 is sealed within a cylindrical sleeve 40 with the second plate 14 located at one end of the sleeve 40 and the first plate 12 spaced from the second plate 14 within the sleeve 40. A supply pipe is engaged with the first plate 12 via the support 42 such that a first material 44 can be fed to the tube 22. The remaining first apertures 18 are blocked by bungs so that they are not fed by the supply pipe. A second material 46 is fed into the sleeve 40 around the support 42 and fills the space between the first and second plates 12,14. The first and second materials 44, 46 are then extruded through the second apertures 20 and the shaping aperture 32 to provide an extrudate consisting of a triangular prism of the second material 46 (e.g. milk chocolate) having a thin filling of the first material 44 (e.g. white chocolate) therethough.

Figure 4:
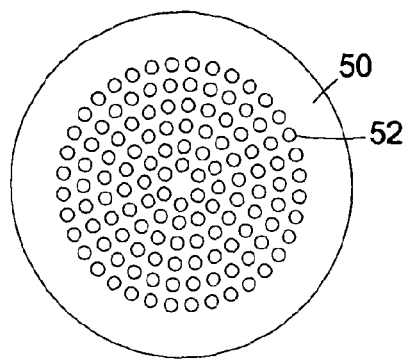
FIG. 4 is a front view of a plate for a die head in accordance with an embodiment of the invention.

Referring to FIG. 4, there is shown a disc-shaped stainless steel plate 50 for use either as a first plate or as a second plate in an extrusion die head. The plate 50 comprises approximately 130 circular apertures 52 which are arranged in a series of concentric circles. Each aperture has the same size and shape. Each aperture has a diameter of approximately 2.1 mm and is spaced from its nearest neighbour by approximately 1 mm i.e. the ratio of the diameter of the aperture to the distance between that aperture and its nearest neighbour is approximately 2:1.

Figure 5:
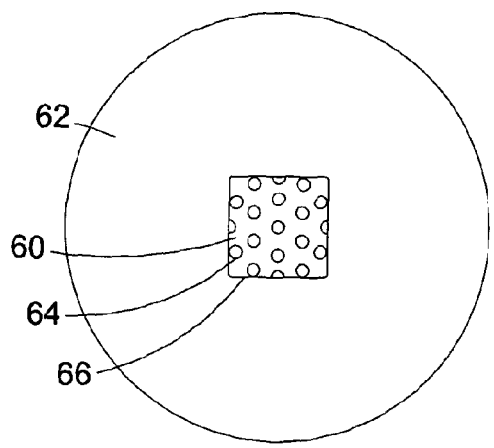
FIG. 5 is a front view of a shaping plate and second plate of accordance with another embodiment of the invention.

Referring to FIG. 5, there is shown a disc-shaped stainless steel second plate 60 and a fastened thereto a disc-shaped stainless steel shaping plate 62. The second plate 62 comprises a plurality of second apertures 64, some of which are visible through a square shaping aperture 66 in the shaping plate 62. The extrudate produced from this apparatus will have a square cross-section and a number of spaced channels extending throughout.

Figure 6:
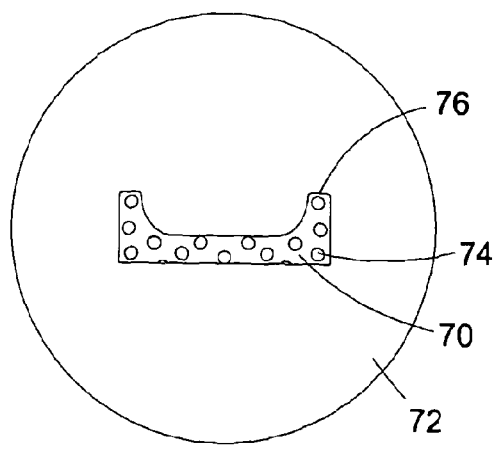
FIG. 6 is a front view of a shaping plate and second plate of accordance with another embodiment of the invention.

Referring to FIG. 6, there is shown a disc-shaped stainless steel second plate 70 and a fastened thereto a disc-shaped stainless steel shaping plate 72. The second plate 72 comprises a plurality of second apertures 74, some of which are visible through a shaping aperture 76 in the shaping plate 72. The shaping aperture 76 is a horizontal slot which extends upwardly at each end and results in an extrudate having the same cross-section with channels of a filling material extending throughout.

Figure 7A:
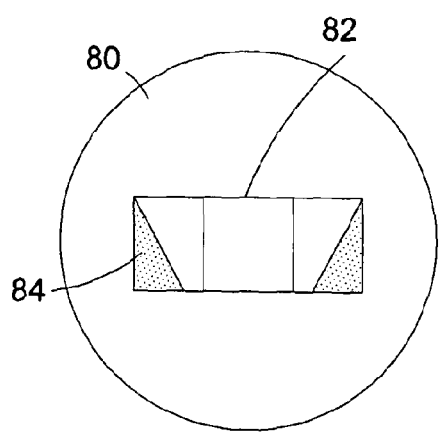
FIGS. 7*a* and 7*b* are front views of a shaping plate in accordance with an embodiment of the invention.
Figure 7B:
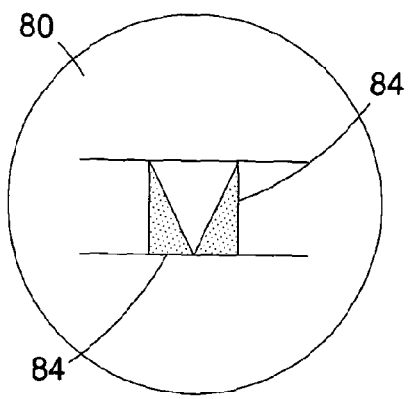

Referring to FIGS. 7a and 7b, there is shown a shaping plate 80 having a square shaping aperture 82 therein. The shaping plate 80 has two triangular cover portions 84 located within shaping plate 80 adjacent the aperture 82. In FIG. 7a the cover portions 84 are located away from the shaping aperture 82 such that the outline of the shaping aperture 82 is square whereas in FIG. 7b the cover portions 84 have been moved linearly to restrict the aperture 82 such that its outline has been changed to a triangle.

The invention claimed is:

1. An extrusion die head for the preparation of a plurality of centre-filled products of varying composition wherein each product comprises a first material and a second material,
   said die head comprising at least one tube such that a first material may be extruded through the tube or tubes and a second material may be extruded around the tube or tubes, and a first plate having a plurality of first apertures therein,
   wherein the location and the number of the tubes may be customised to vary the location and amount of the first material relative to the second material and thereby vary the composition of the centre-filled product; and
   the customization is achieved via the at least one tube being detachably engaged with the first plate such that a flow path is defined for the first material from the first apertures through the associated at least one tube; and
   wherein the number of first apertures is greater than the number of tubes.

2. The die head of claim 1 comprising
   a second plate spaced from the first plate and having a plurality of second apertures therein; and
   wherein the or each tube is detachably engaged at opposite ends to the first and second plates respectively whereby to define a flowpath between a pair of first and second apertures.

3. The die head of claim 2, wherein a shaping plate comprising at least one shaping aperture is fastened to the second plate thereby modifying the cross-section of the resulting extrudate.

4. The die head of claim 2, wherein the second plate comprises at least 25 second apertures.

5. The die head of claim 2, wherein the number of second apertures is greater than the number of tubes.

6. The die head of claim 2, wherein all of the second apertures have substantially the same size and shape.

7. The die head of claim 2, wherein the ratio of the diameter of a second aperture to the distance between that second aperture and its nearest neighbour is from 3:1 to 1:1.

8. The die head of claim 1 comprising
   a shaping plate having a shaping aperture therein;
   wherein the first plate is spaced from the shaping plate; and
   wherein said at least one tube is located between the shaping plate and the first plate so as to define a flowpath between the first aperture and the shaping aperture.

9. The die head of claim 1, wherein the first plate comprises at least 25 first apertures.

10. The die head of claim 1, wherein all of the first apertures have substantially the same size and shape.

11. The die head of claim 1 comprising
    a shaping plate having a shaping aperture therein; and
    the first plate spaced from the shaping plate has a plurality of telescopic tubes attached thereto, each tube having an extended position whereby to define a flowpath through the tube to the shaping aperture and a retracted position wherein flow is prevented.

12. The die head of claim 1, comprising at least 10 tubes.

13. The die head of claim 1, wherein at least one tube has a diameter of no more than 3 mm.

14. An extrusion die apparatus comprising a sleeve enclosing the die head of claim 1.

15. The apparatus of claim 14, wherein the die head comprises a shaping plate having a shaping aperture therein and the shaping plate is detachably engaged with the sleeve.

16. An extrusion method for the preparation of a plurality of centre-filled products of varying composition wherein each product comprises a first material and a second material, the method comprising extruding the first material through at least one tube attached to a first plate having a plurality of first apertures therein such that a flow path is defined for the first material from the first apertures through the associated tube, and the second material around the tube or tubes;
- wherein the location and the number of the tubes may be customised to vary the location and amount of the first material relative to the second material and thereby vary the composition of the centre-filled product;
- the customization is achieved via the at least one tube being detachably engaged with the first plate; and the number of first apertures is greater than the number of tubes.

17. The method of claim 16 comprising extruding a first material and a second material using the extrusion die of claim 2, comprising
- conveying a first material from a first aperture via the at least one tube to a second aperture; and
- simultaneously conveying a second material directly to a second aperture;
- whereby to co-extrude the first material and the second material through the second apertures.

18. The method of claim 16 comprising extruding a first material and a second material using the extrusion die of claim 8, comprising
- conveying a first material from a first aperture via the at least one tube to the shaping aperture; and
- simultaneously conveying a second material directly to the shaping aperture;
- whereby to co-extrude the first material and the second material through the shaping aperture.

19. The method of claim 16 comprising extruding a first material and a second material using the extrusion die of claim 11, comprising
- conveying a first material through an extended telescopic tube to the shaping aperture; and
- simultaneously conveying a second material directly to the shaping aperture;
- whereby to co-extrude the first material and the second material through the shaping aperture.

20. The method of claim 16, wherein the first material is selected from a gas, liquid, gel, paste, powder or an extrudable solid.

21. The method of claim 16, wherein the second material is an edible extrudable solid.

22. The method of claim 21, wherein the edible extrudable solid is chocolate.

23. The method of claim 16, wherein at least one tube has a diameter of no more than 3 mm.

24. The extrusion die head of claim 1 comprising a shaping plate, the shaping plate having a shaping aperture therein, wherein the outline of the shaping aperture may be changed.

25. The shaping plate of claim 24, wherein a moveable cover portion is located within the shaping plate.

* * * * *